Nov. 26, 1968   R. L. DILLS   3,413,445
FRONT HEATING AND THERMAL BREAKER MEANS FOR SELF-CLEANING OVEN
Filed Sept. 26, 1966
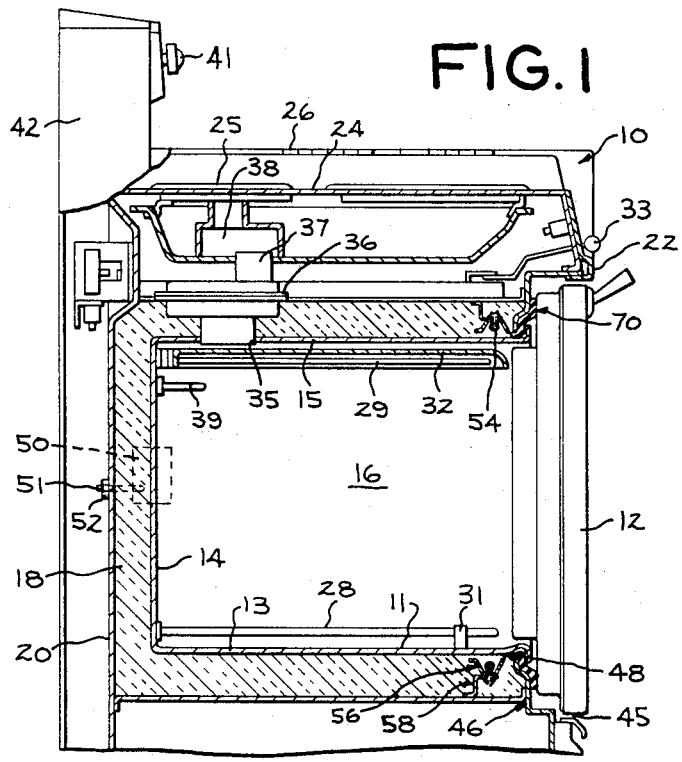
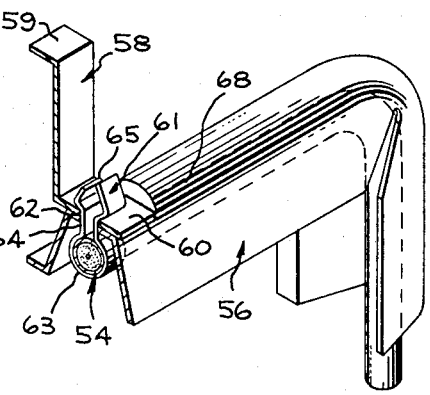
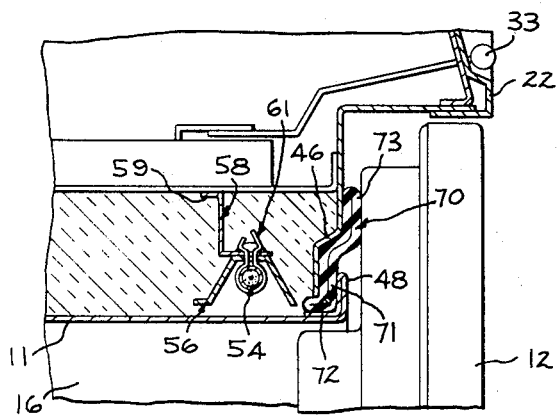
INVENTOR.
RAYMOND L. DILLS
BY *Richard L. Caslin*
HIS ATTORNEY

United States Patent Office 3,413,445
Patented Nov. 26, 1968

3,413,445
FRONT HEATING AND THERMAL BREAKER MEANS FOR SELF-CLEANING OVEN
Raymond L. Dills, Louisville, Ky., assignor to General Electric Company, a corporation of New York
Filed Sept. 26, 1966, Ser. No. 581,891
4 Claims. (Cl. 219—406)

The present invention relates to ovens for cooking foods, and particularly to an improved design of a supplementary heating means for the front portion of the oven liner, as well as a means for breaking the heat path between the oven liner and the front of the oven housing so as to obtain maximum thermal efficiency during a pyrolytic or heat cleaning cycle which is operated for automatically removing the food soils and grease spatter from the walls forming the oven cavity.

This invention is related to an automatic self-cleaning oven using a pyrolytic process at a high range of temperature, preferably between about 750° F. and about 950° F. as disclosed and claimed in the patent of Bohdan Hurko No. 3,121,158, which is assigned to the General Electric Company, the assignee of the present invention. One of the many important features conceived by Hurko was the use of a supplementary heating means or mullion heater adjacent the front of the oven liner for compensating for heat lost through and around the oven door during the heat cleaning cycle.

The present invention also involves an improvement in the tension mounting means that heretofore cooperated with the mullion heater as is taught in the patent of J. K. Newell, Jr., No. 3,017,488, which is also assigned to the assignee of the present invention. In the Newell design, the mullion heater is sandwiched between an annular lip at the front of the oven liner and a rear flange of a separate metal breaker frame which is interposed between the annular lip of the oven liner and the peripheral edge of a front opening in the oven housing.

The principal object of the present invention is to provide an oven with a supplementary heating means adjacent the front portion of the oven liner that is spaced from the oven liner and is supported independently thereof so as to avoid creating points of high mechanical and thermal stress concentration in the walls of the oven liner that might otherwise shorten the expected life of the porcelain enamel which coats the inner surface of the walls of the oven cavity.

A further object of the present invention is to provide an oven with a mullion heater near the front portion of the oven liner that is supported independently of the oven liner, as well as to provide a thermal break between the front of the oven liner and the oven housing so as to retain much of the heat energy for the walls of the oven cavity.

A still further object of the present invention is to provide an oven of the class described with a flexible breaker strip member for the front portion of the oven liner that has an easy means of assembling the breaker strip to the oven liner prior to the assembly of the oven liner to the oven housing.

The present invention, in accordance with one form thereof, is embodied in a self-cleaning baking oven having walls forming an oven cavity. A supplementary heating means encircles the front portion of the oven liner and is supported from the oven housing independent of and spaced from the oven liner. Moreover, there is a nonmetallic breaker strip and door gasket tied around the front of the oven liner and sandwiched between the oven liner and the front frame of the oven housing.

My invention will be better understood from the following description taken in conjunction with the accompanying drawing and its scope will be pointed out in the appended claims.

FIGURE 1 is a fragmentary left-side elevational view of an electric range having a self-cleaning oven embodying the present invention with some parts broken away and others in cross-section to show the principal elements at the front of the oven liner.

FIGURE 2 is an enlarged fragmentary view of the vicinity of the front of the oven liner at the top thereof showing the nature of the mullion heater independently supported from the oven liner as well as the breaker strip interposed between the front of the oven liner and the oven housing.

FIGURE 3 is a fragmentary perspective view of the nature of the mullion heater and its relationship with the shielding member that is interposed thereover as well as the connection between the mullion heater, the reflecting shield, the widely spaced supporting brackets and finally the snap-on clip members for connecting the various elements together.

Turning now to a consideration of the drawing, and in particular to FIGURE 1, there is shown an electric range 10 having as its principal components a box-like oven liner 11 in combination with a front-opening access door 12 which form an oven cooking cavity. The oven liner 11 is of sheet metal construction having a bottom wall 13, a back wall 14, a top wall 15, and opposite side walls 16. The front of the oven liner is open and it is adapted to be closed by the door 12.

As in standard oven designs, a layer of thermal insulating material 18 such as fiber glass or the like completely surrounds the oven liner on all five sides and serves to retain the heat present in the oven cavity so as to render the oven thermally efficient. A sheet metal insulation guard 20 of generally box-like construction is formed around the outside of the layer of insulation 18 to assist in supporting the insulation and protecting the insulation from damage or from shifting out of place. The oven is further provided with an outer casing or oven housing 22 that has a decorative external finish such as porcelain enamel or the like to enclose the entire oven assembly and serve as the supporting superstructure therefor.

This invention is shown for illustrative purposes as being a part of a complete electric range 10 but it will be understood by those skilled in this art that the same invention could be adopted for a gas oven design without departing from the scope of the present invention. There is a top cooking surface or cooktop 24 assembled over the oven and including a plurality of surface heating units 25 formed of metal sheathed resistance heating elements of coiled configuration as is conventional in this art. Each surface heating unit 25 is provided with a multiple selector switch such as pushbutton switch 26 for governing the various heating circuits for the unit. These selector switches are shown mounted in the opposite side edges of the cooktop 24 and they are oriented relative to the respective heating unit being controlled thereby.

The oven cavity is provided with two heating elements; namely, a lower baking element 28 and an upper broiling element 29 which are each in the form of a metal sheathed resistance heating element that is bent into a large loop or series of loops and provided with a pair of terminal ends which extend through the back wall 14 of the oven liner for making electrical connection therewith. The baking element 28 is provided with a plurality of supporting clips or feet 31 for holding the baking element off of the bottom wall 13 of the oven liner so as not to develop hot spots that might otherwise damage the porcelain enamel finish which cover the interior surface of the walls of the oven cavity. The upper broiling element 29 is provided with a pan-shaped reflector 32 which overlies the broiling element and serves to direct the radiant energy downward into the oven cavity as well as to shield the upper wall 15 of the oven liner from the intense heat.

As in standard baking and broiling ovens, the oven cavity will be provided with one or more oven racks that are adapted to be supported on rack-supporting embossments or ledges on the opposite side walls 16, 16 but these are not illustrated in the drawing since they do not form part of the present invention. Moreover, the oven door 12 is made of several shallow pan-shaped sheet metal panels that are fastened together in a unitary structure, and its interior is essentially filled with thermal insulating material (not shown) such as fiber glass or the like so that the oven heat is retained in the cooking cavity during the heat cleaning cycle as well as for obtaining generally uniform cooking results no matter where the food might be placed on the oven racks.

Other elements illustrated in the drawing but which do not form a part of the present invention will be discussed here briefly for ease in understanding the environment in which the present invention is located. First, there is a door latch handle 33 which is used for locking the oven door 12 during the high temperature heat cleaning cycle. A typical door latch mechanism is illustrated in the patent of Clarence Getman 3,189,375 which is also assigned to the assignee of the present invention. Next, the oven cavity is provided with a venting system at the rear thereof having an exhause duct 35 mounted in the top wall 15 of the oven liner so that the gaseous degradation products formed during the pyrolytic cleaning cycle may be exhausted to the outside of the oven. Interposed in this exhaust duct 35 is a catalytic oxidation unit 36 which serves both as a smoke and odor eliminator. There is an exhaust port 37 from the oxidation unit and it discharges into a labyrinth formed by duct work 38 which eventually discharges beneath one of the rear surface heating units 25 of the cooktop 24. One example of a satisfactory oxidation unit is of the type that is disclosed in the patent of Stanley B. Welch No. 2,900,483, which patent is also assigned to the assignee of the present invention.

A standard oven thermostatic control system comprises a temperature sensor such as a probe 39 which is mounted at the top portion of the back wall 14 of the oven liner 11. Such a probe is a tubular member with a coil of nickel or platinum resistance wire (not shown) wound therein and which is electrically connected by several lead wires to an electrical responder, shown diagrammatically in FIGURE 1 as element 41 that is assembled in a control panel of the backsplash 42 arranged along the rear edge of the cooktop 24.

Mention will now be made of the techniques of supporting the oven liner 11 in the oven housing 22. As depicted in FIGURE 1, the front panel of the oven housing 22 is provided with a large rectangular door opening 45 having a recessed door frame created by a stepped configuration 46 which extends rearwardly of the front housing in a generally converging manner. The front edge of the inner oven liner 11 is provided with an outwardly directed annular lip 48 which is generally conventional in this art and which is formed by rolling over the edge and doubling it under as is best seen in FIGURE 2. This forms a reinforced flange that is capable of withstanding a strong tension force that is to be applied at the back of the oven liner.

A bracket member 50 is fastened to each side wall 16 of the oven liner at the rear thereof, and there is a J-bolt 51 for each bracket member which extends forwardly through the insulation guard 20 and insulation 18 and is provided with an adjusting nut 52 on its free end such that the tightening of the nut will shorten the effective length of the bolt and exert a pulling force against the back of the oven liner tending to draw the annular lip 48 of the oven liner toward engagement with the innermost edge of the front door frame 46 of the oven housing 22. This method is quite similar to the method of supporting the oven liner in standard domestic ovens.

As is best illustrated in FIGURE 1, there is a supplementary heater of mullion heater 54 that is adapted to encircle the front portion of the oven liner 11 but to be supported independently thereof. This mullion heater 54 is a metal sheathed electrical resistance element for example having a helical michrome wire that is insulated with magnesium oxide and jacketed with an incoloy sheath as is well known in this art. Such a supplementary heater is set back from the annular lip 48 of the oven liner 11 and it is spaced off the outer walls of the oven liner.

Looking at both FIGURES 2 and 3 the supplementary heater 54 is supplied with a diverging reflecting shield 56 which overlies the heater substantially for the length thereof and is directed toward the adjacent wall of the oven liner so as to focus the heat energy of the heater toward the nearest portion of the wall of the oven liner.

The interior of the oven housing 22 is supplied with a plurality of widely spaced Z-shaped brackets 58 which are each welded at one end 59 to the oven housing and at the other end 60 are adapted to receive a spring clip 61 through a suitable slotted opening 62. As is best seen in FIGURE 3, this spring clip 58 is of generally hair-pin shape having an enlarged circular portion 63 which closely grips the sheath of the heater 54, and a stem portion 64 which comprises a pair of spring fingers which are adapted to fit through the slot 52 of the bracket, and then finally hook shaped converging tips 65 on the fingers so the clip member may be forced through the slot 62 and will spring outwardly and become locked therein. The spring clip 61 serves not only to support the heater 54 from the bracket 58 but also the reflecting shield 56 since the shield is formed with a flattened section 68 adjacent each bracket so as to abut the underside of the innermost portion 60 of the bracket as is seen in FIGURE 3.

Many advantages flow from the use of a mullion heater 54 that is mounted independently of the oven liner 11. If the mullion heater were fastened to the oven liner by use of welded tabs, for example, the welding operation might tend to jeopardize the porcelain enamel coating formed on the inside surface of the oven liner and again during the pyrolytic cycle when the temperature of the oven liner is raised to temperatures somewhere between about 750° F. and 950° F. The mullion heater 54 is adapted to be energized during the heat cleaning cycle and this causes the thermal expansion of the sheath.

This thermal expansion would place mechanical and thermal stresses on the welded tabs which in turn would place stresses on the walls of the oven liner and finally on the porcelain enamel. Moreover, in the practice of the present invention when it is necessary for the appliance serviceman to replace an oven liner of a self-cleaning oven in the owner's home, it is an easy manner to disconnect the tension bolts 51 at the back of the oven liner and merely pull out the oven liner without having to disconnect and contend with the mullion heater and thermal breaker frame assembly that would otherwise be affixed thereto.

Another advantage of having the mullion heater 54 mounted away from the oven liner walls is that it is possible to locate the mullion heater rearwardly of the front wall of the oven housing so that there will be less conduction of heat to the said front wall and it will simplify the design of a heat break between the front of the oven liner and the front of the oven housing so that there would be less loss of heat energy at the front of the oven as well as lower external temperatures of the oven housing and finally better heat distribution on the walls of the oven cavity.

Turning to a consideration of the enlarged view of FIGURE 2, it will be noticed that there is a combined breaker strip and door gasket 70 that has the breaker strip portion 71 interposed between the back side of the annular lip 48 of the oven liner and the peripheral edge of the recessed flange 46 framing the front door opening 45 of the oven housing 22. This combined breaker strip and door gasket 70 is a heavy belt-like member of fiber glass material or the like which is of generally flattened or folded construction and is provided with an internal wire form or tie member 72 adjacent the innermost edge of the breaker strip portion 71 nearest the walls of the oven liner so that it is possible to fasten this element 70 to the oven liner by a simple tying action prior to the time the oven liner is thrust through the front opening 45 in the front wall of the oven housing 22. A door gasket portion 73 of the element 70 would extend generally away from the annular lip 48 in the manner of a collar. Once the oven liner 11 is positioned in place and fastened by the J-bolts 51, the door gasket portion 73 of the element 70 would be pressed against the front wall 70 of the oven housing. This element 70 would take a partial set after the oven door 12 was closed several times and it would generally remain in place due to being pinched or sandwiched between the annular lip 48 and the peripheral edge of the door frame 46.

Modifications of this invention will occur to those skilled in this art, therefore it is to be understood that this invention is not limited to the particular embodiments disclosed but that it is intended to cover all modifications which are within the true spirit and scope of this invention as claimed.

What I claim as new and desire to secure by Letters Patent of the United States is:

1. An oven comprising an oven liner of box-like construction with a front opening for gaining access thereto, an oven housing surrounding the oven liner and including a layer of thermal insulation to insulate the housing from the oven liner, the oven housing also having a front opening for receiving the oven liner therethrough, an oven door mounted at the front of the oven for closing the front opening of the oven liner, an outwardly extending annular lip formed on the oven liner near the front thereof, tension means at the back of the oven housing for pulling against the oven liner so that the said annular lip of the oven liner is drawn toward the edge of the said opening in the front of the oven housing, heating means for raising the temperature within the oven; the invention comprising a combined breaker strip and door gasket member and a wire-like member threaded therethrough whereby the said combined member is fastened to the oven liner behind the said annular lip by tying the wire-like member around the oven liner, the breaker strip portion of said member being sandwiched between the annular lip of the oven liner and the peripheral edge of the opening in the oven housing, while the door gasket portion of the combined member is disposed against the front of the oven housing and adapted to bear against the inside of the oven door so as to substantially close the gap therebetween, and a supplementary heating means encircling the front portion of the oven liner but separate therefrom for supplying heat energy to the front of the oven liner to replenish the heat lost through and around the oven door, said supplementary heating means including a heat reflecting shield directing its heat energy toward the nearest portion of the oven liner, and support means for supporting both the supplementary heating means and its heat reflecting shield from the oven housing.

2. An oven as recited in claim 1 wherein the said support means for both the supplementary heating means and its heat reflecting shield comprises a series of widely separated bracket members which are spaced rearwardly from the peripheral edge of the front door opening in the oven housing, and quick-connect fastener means for joining the heating means to the shield and to the bracket members.

3. An oven comprising an oven liner of box-like construction with a front opening for gaining access thereto, an oven housing surrounding the oven liner and including a layer of thermal insulation to insulate the housing from the oven liner, the oven housing also having a front opening for receiving the oven liner therethrough, an oven door mounted at the front of the oven for closing the front opening of the oven liner, an outwardly extending annular lip formed on the oven liner near the front thereof, tension means at the back of the oven housing for pulling against the oven liner so that the said annular lip of the oven liner is drawn towards the edge of the said opening in the front of the oven housing, heating means for raising the temperature within the oven; the invention comprising a supplementary heating means encircling the front portion of the oven liner but separate therefrom for supplying heat energy to the front of the oven liner to replenish the heat lost through and around the oven door, said supplementary heating means including a heat reflecting shield directing its heat energy toward the nearest portion of the oven liner, and spaced brackets on the oven housing for supporting the supplementary heating means and the said shield closely spaced from the oven liner and rearwardly from the said annular lip, and a high temperature non-metallic breaker strip of lower heat conductivity than metal interposed between the annular lip of the oven liner and the edge of the said opening in the front of the oven housing so as to reduce the conduction of heat from the front of the oven liner to the oven housing, and a flexible tie member combined with the breaker strip for tying the breaker strip in position on the oven liner prior to the assembly of the oven liner in the oven housing.

4. An oven comprising an oven liner of box-like construction with a front opening for gaining access thereto, and oven housing surrounding the oven liner and including a layer of thermal insulation to insulate the housing from the oven liner, the oven housing also having a front opening for receiving the oven liner therethrough, an oven door mounted at the front of the oven for closing the front opening of the oven liner, an outwardly extending annular lip formed on the oven liner near the front thereof, tension means at the back of the oven housing for pulling against the oven liner so that the said annular lip of the oven liner is drawn towards the edge of the said opening in the front of the oven housing, heating means for raising the temperature within the oven, supplementary heating means encircling the front portion of the oven liner for supplying heat energy to the front of the oven liner to replace the heat lost through and around the oven door, said supplementary heating means including a heat reflecting shield directing its heat energy toward the nearest portion of the oven liner, and widely spaced brackets on the oven housing for supporting the supplementary heating means and shield closely adjacent the oven liner, but spaced therefrom, as well as being located rearwardly of the said annular lip, spring clip fastening means for holding the supplementary heater to the shield as well as to the said bracket, and high temperature fabric breaker means for breaking the heat path between the annular lip of the oven liner and the related portions of the oven housing.

References Cited

UNITED STATES PATENTS

| | | | |
|---|---|---|---|
| 3,017,488 | 1/1962 | Newell | 219—406 |
| 3,053,963 | 9/1962 | Dills | 219—413 |
| 3,121,158 | 2/1964 | Hurko | 219—397 |

BERNARD A. GILHEANY, *Primary Examiner.*

VOLODYMYR Y. MAYEWSKY, *Assistant Examiner.*